United States Patent
D'Achard Van Enschut et al.

(10) Patent No.: US 6,947,013 B2
(45) Date of Patent: Sep. 20, 2005

(54) DISPLAY DEVICE COMBINING AMBIENT LIGHT WITH MAGNIFIED VIRTUAL IMAGES GENERATED IN THE EYE PATH OF THE OBSERVER

(75) Inventors: Johannes Franciscus Martinus D'Achard Van Enschut, Eindhoven (NL); Wouter Roest, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 215 days.

(21) Appl. No.: 10/176,218

(22) Filed: Jun. 20, 2002

(65) Prior Publication Data

US 2002/0196200 A1 Dec. 26, 2002

(30) Foreign Application Priority Data

Jun. 21, 2001 (EP) ............................................. 01202411

(51) Int. Cl.$^7$ ................................................. G09G 5/00
(52) U.S. Cl. .................................. 345/6; 345/7; 349/11; 359/630
(58) Field of Search ............................ 345/6–9, 87, 97; 349/5, 11; 359/630

(56) References Cited

U.S. PATENT DOCUMENTS

| 5,790,284 A | * | 8/1998 | Taniguchi et al. | ............ 359/15 |
| 6,023,253 A | * | 2/2000 | Taniguchi et al. | ............ 345/7 |
| 6,215,532 B1 | * | 4/2001 | Takagi et al. | ............ 349/11 |

FOREIGN PATENT DOCUMENTS

EP          0977071 A1    2/2000       G02B/27/01

\* cited by examiner

*Primary Examiner*—Amr A. Awad

(57) ABSTRACT

A display device positions an observer's eye (or eyes) to look in a particular direction (eye path). An electronically controlled image generating element in the eye path generates artificial images which are magnified to create a virtual image for the eye. The image generating element is transparent so that it also passes ambient light from the eye path to the eye.

21 Claims, 2 Drawing Sheets

DISPLAY DEVICE COMBINING AMBIENT LIGHT WITH MAGNIFIED VIRTUAL IMAGES GENERATED IN THE EYE PATH OF THE OBSERVER

The invention relates to a display device for positioning at least one eye defining an eye path, the device comprising an image-generating means for generating artificial images, a control system for electronically controlling the image-generating means, and a magnifying optical system for magnifying the artificial images to a virtual image for the at least one eye.

Such a display device, often in the form of spectacles or a helmet, is known from Japanese patent application JP 10104549. This device comprises an image-generating means arranged outside the eye path and controlled by a control system so that desired virtual images can be generated. The image from the image-generating means is visible to an eye via a semi-transmissive reflecting element arranged obliquely in the eye path and a lens arranged outside the eye path. Due to the semi-transmissivity of the reflecting element, images from the ambience of the display device may also be visible as a background, in which a combination of a polarizer with a liquid crystal layer is present on the rear side of the reflective element. This provides the possibility of influencing the intensity of the background image so that a satisfactory ratio can be obtained between the intensities of the virtual image and the real image.

The structure of the display device as described in said Japanese patent specification has the drawback of a limited obtainable image size. This is because the aperture angle associated with the image size is limited by using the obliquely arranged semi-transmissive reflecting element in combination with the lens arranged outside the eye path, which is also the boundary for the maximal aperture angle. Moreover, it is to be noted that the display device as described in said Japanese patent application will require relatively much space in the height direction because of the presence of the image-generating means and the magnifying optical system outside the eye path.

It is an object of the invention to provide a display device as described in the opening paragraph in which, either or not in preferred embodiment of the invention, a considerable improvement of the above-mentioned drawbacks of the prior art is realized. To this end, the invention is characterized in that the image-generating means is transparent and is present in the eye path for passing external light coming from the ambience of the display device, present in the eye path, to the eye. The use of such an image-generating means provides the possibility of placing the magnifying optical system and/or the image-generating means itself relatively close in front of the eye, so that a large aperture angle for the eye, i.e. a large image size, can be obtained. This is possible with a relatively small image-generating means, which reduces the cost price of the display device. Due to the transparent character of the image-generating means, it is possible to combine a virtual image and an image of the ambience for the eye.

To couple in light to the image-generating means for intensifying the luminance of the virtual image, a preferred embodiment of the display device according to the invention is characterized in that it is provided with a semi-transmissive reflecting element arranged obliquely in the eye path on the side of the image-generating means remote from the at least one eye, said element reflecting light coming from a light source outside the eye path to the image-generating means and passing the external light to the eye. In principle, a light source which is present outside the eye path can be formed, for example, by natural sunlight. Since the reflecting element partially transmits light, it will also remain possible to combine a virtual image and an image of the ambience for the eye.

In order to obtain an image quality which is as constant as possible, the display device according to the invention is preferably provided with an artificial light source arranged outside the eye path for illuminating the image-generating means via the semi-transmissive reflecting element. Although it is possible within the scope of the invention to visualize the virtual image by means of ambient light, which has or has not been rendered diffuse, the use of an artificial light source provides said advantages.

The semi-transmissive reflecting element is preferably constituted by a semi-transmissive polarizing mirror. This provides the advantage that also the external light will assume a given state of polarization so that also the polarized external light is modulated by the transmissive liquid crystal matrix. This means that a common control of the intensity of both the virtual image of the transmissive liquid crystal matrix and the real image of the external light can be jointly adjusted by suitable control of the transmissive liquid crystal matrix.

A very practical embodiment of the display device according to the invention can be obtained if the image-generating means comprises a transmissive liquid crystal matrix. Such an embodiment utilizes the transparent image-generating means available at the time of the invention. By using a transmissive liquid crystal matrix in the eye path, a relatively compact display device can be obtained with an optimal magnification factor and a resultant improved image size because both the dimensions of the transmissive liquid crystal matrix and those of the magnifying optical system may be relatively limited, which also reduces the cost price of a display device according to the invention.

For visualizing the virtual image in a simple way, a polarizer arranged between the at least one eye and the image-generating means is preferably used, notably in a transmissive liquid crystal matrix, which polarizer is provided in a preferred embodiment of the display device according to the invention.

In principle, the display device according to the invention provides the possibility of combining an artificial image with a real image of the ambience of the display device because of the use of the semi-transmissive reflecting optical element. The display device according to the invention is preferably characterized in that it is provided with an adjustable shutter element for the external light on the side of the image-generating means remote from the at least one eye, so that this also creates the possibility of eliminating the external light so that, for example, only the virtual image generated by a transmissive liquid crystal matrix is visible.

A very advantageous and simple embodiment of such an adjustable shutter element is obtained if this element is constituted by a shutter which is displaceable between positions within and outside the eye path. Such a shutter may be displaced by manually operating a suitable operating means on the outer side of a possible housing of the display device.

Alternatively, the shutter may be constituted by a liquid crystal with a polarizer on the side of the liquid crystal remote from the semi-transmissive reflecting element. This preferred embodiment has the advantage that the quantity of polarized light can be steplessly adjusted by suitable control of the liquid crystal, which light is passed on to the semi-transmissive reflecting element. A desired ratio between the virtual image and the real image can be adjusted in this way.

A very compact embodiment of a display device according to the invention can be obtained if the magnifying optical system is present in the eye path on the side of the image-generating means facing the at least one eye.

In accordance with a very advantageous preferred embodiment, the display device according to the invention is provided with a separate optical system for the external light. For example, the light coming from the external light source can be increased with such a separate optical system. This may be advantageous, for example, in surgical applications in which a magnified image of the operation area is obtained.

It is also possible to adapt the separate optical system advantageously for at least partly compensating the magnifying effect of the magnifying optical system on the external light. It is thereby prevented that, proportionately, the image of the ambience is displayed too large or deviates from reality. As a rule, it will be considered important when the image of the ambience corresponds to the real size of this ambience.

These and other aspects of the invention are apparent from and will be elucidated with reference to the embodiments described hereinafter.

Figure 1:
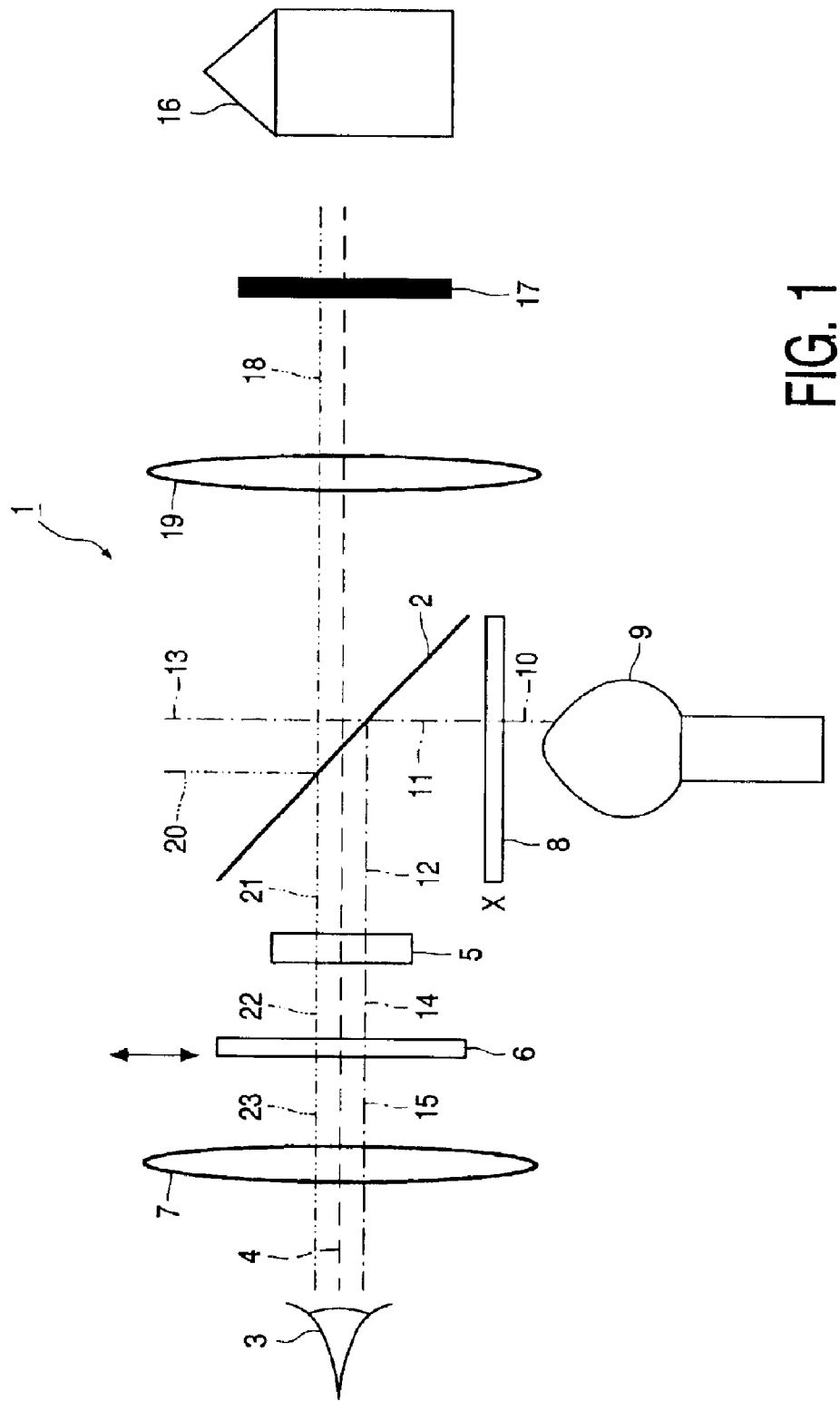
FIG. 1 shows diagrammatically a first preferred embodiment.

FIG. 1 shows diagrammatically the elements substantially constituting a first preferred embodiment 1 of a display device according to the invention. A central element in the display device 1 is the semi-transmissive mirror 2. This semi-transmissive mirror 2 reflects half of the incoming light and passes the other half unhindered. These properties of the semi-transmissive mirror 2 provide the possibility of combining a virtual image and a real image for the eye 3. An imaginary eye path 4 extends perpendicularly to eye 3. A plurality of elements which will hereinafter be elucidated is present within this eye path 4 and outside it. The semi-transmissive mirror 2 has already been mentioned. Viewed from the mirror 2, the transmissive liquid crystal matrix 5, a vertical polarization filter 6 and a magnifying lens 7 are arranged between this mirror 2 and the eye 3. The transmissive liquid crystal matrix is known to those skilled in the art and consists of a matrix of liquid crystal elements which are individually and electronically controllable by a control system (not shown), with which elements an image can be generated. Dependent on the control signal for a given matrix element, a change of the state of polarization of the light incident on the relevant matrix element will take place. The linearly polarized light is passed to a greater or lesser extent by the vertical polarization filter 6 as will also be elucidated hereinafter.

In the use of a liquid crystal display (LCD), a transmissive liquid crystal matrix denoted by reference numeral 5 is incorporated between two polarization filters which are generally operative at a rotated angle of 90 degrees with respect to each other. The display device 1 also has such a structure, in which the rear polarization filter is constituted by the vertical polarization filter 6, while the front polarization filter is constituted by the horizontal polarization filter 8. Light coming from light source 9, which likewise as the horizontal polarization filter 8 is present outside the eye path 4 and may be formed, for example, by a LED, assumes a horizontal state 11 of polarization. This horizontally polarized light 11 is half reflected by the semi-transmissive mirror 2 into a direction perpendicular to the transmissive liquid crystal matrix 5 and parallel to eye path 4. This reflected part is denoted by reference numeral 12. The other half is passed unhindered on its original path and is not further utilized. Due to the irradiation by the reflected horizontally polarized light 12 from the transmissive liquid crystal matrix 5, it is principally possible to visualize an image generated by the transmissive liquid crystal matrix 5. Dependent on the control voltage of the relevant matrix element, a change of the state of polarization of the reflected horizontally polarized light 12 will take place or not take place per matrix element. This leads to a modulated light beam 14 which, dependent on the extent of change of the state of polarization that has taken place, will pass through the vertical polarization filter 6 to a given proportional extent. This image light 15 is visible to the eye 3. The magnifying lens 7 is provided to increase the size of the image represented by light 15.

As is diagrammatically shown in FIG. 1, the display device 1 provides the possibility of combining a virtual image generated by the transmissive liquid crystal matrix 5 with a reality image 16, also in eye path 4. Display device 1 comprises a shutter 17 on its side facing the reality image 16, which shutter is displaceable within and outside the eye path 4 by means of, for example, panning or displacement. In the situation shown in FIG. 1, the shutter 17 is in the eye path 4. If this is not the case, light 18 from the reality image 16 passes through a diminishing lens 19 which is intended to compensate the magnifying effect of the magnifying lens 7. Due to the combined effect of the lenses 7 and 19, the reality image 16 will be observed at eye 3 in real dimensions. The light 18 meets the semi-transmissive mirror 2 on its path to the eye 3. One half 20 of light 18 is reflected at an angle of approximately 90 degrees, while the other half 21 continues its path unhindered. Light 21 has the same properties as light 18, be it that this light 21 has only half the intensity of light 18. Passage of light 21 through the transmissive liquid crystal matrix 5 does not have any net influence on the light beam 22 exiting from the transmissive liquid crystal matrix 5 because of the absence of a given state of polarization of light beam 21. The exiting light beam 22 is vertically polarized by the vertical polarization filter 6 so that image light 23 is produced which originates from light coming from the reality image 16. Image light 23 is visible to the eye 3.

A limited number of possibilities is available for controlling the ratio between the virtual image and the reality image 16. By operating the shutter 17, reality image 16 may be completely shielded from the eye 3. Influencing of the intensity of light 10 by dipping or magnifying light source 9 has a corresponding influence on the intensity of the virtual image. Moreover, it is also possible to control the matrix elements of the transmissive liquid crystal matrix 5 by means of a general control signal which is used independently of generating the virtual image as such.

Figure 2:
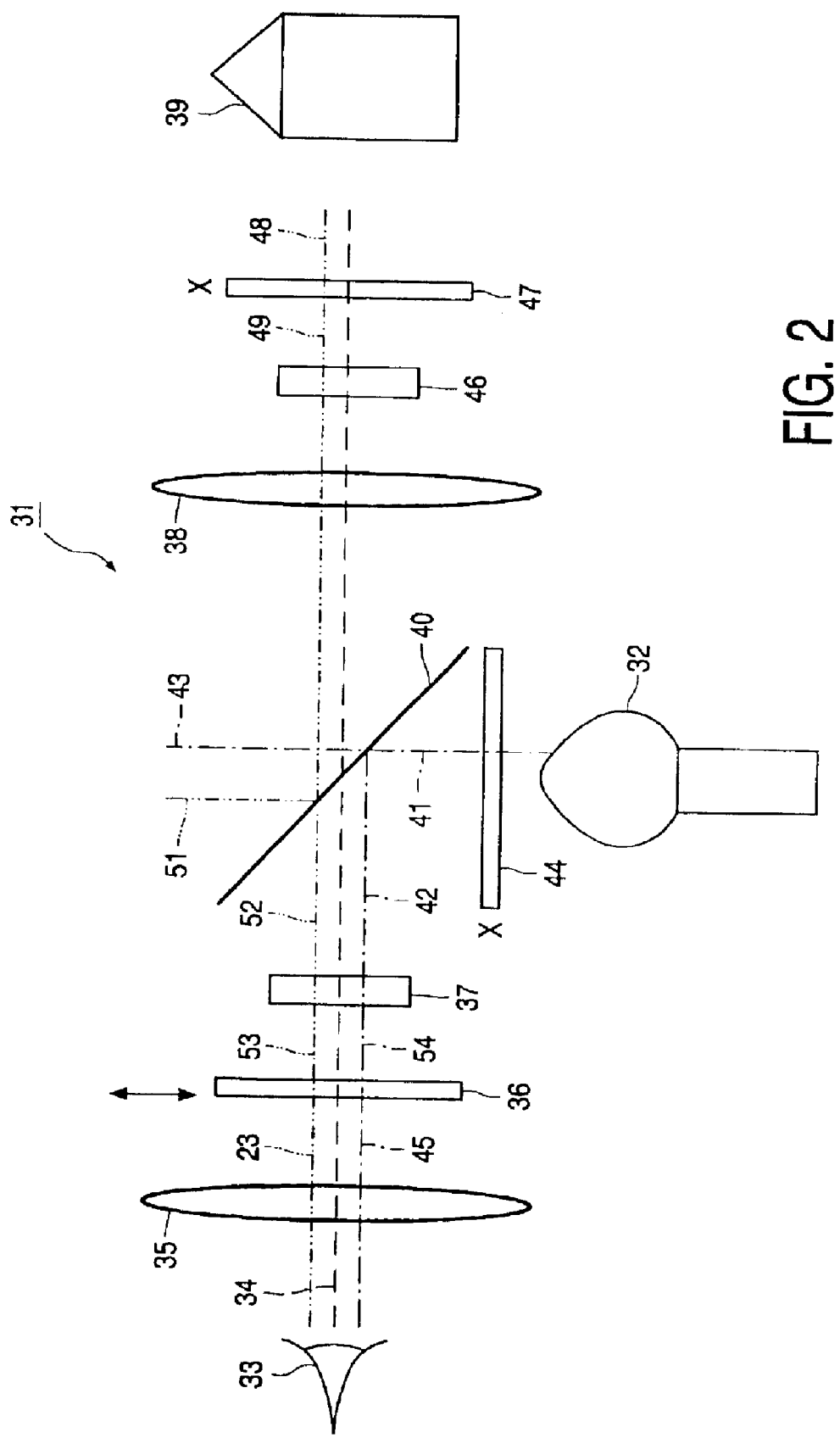
FIG. 2 shows diagrammatically a second preferred embodiment.

The display device 31 in accordance with the second preferred embodiment as shown in FIG. 2 corresponds to the display device 1 of FIG. 1 in various ways. These conformities are notably the presence of light source 32, eye 33 with eye path 34, magnifying lens 35, the vertical polarization filter 36, the transmissive liquid crystal matrix 37, the diminishing lens 38 and the reality image 39.

As compared with the display device 1, the semi-transmissive mirror 2 is replaced by a polarizing beam splitter 40. The polarizing beam splitter 40 has the property of reflecting incoming light, such as light 41 from light source 32, to a horizontally polarized state (reference numeral 42) and not reflecting it in a vertically polarized state (reference numeral 43). Due to the limited quality, at least as regards the reflective properties of the currently available polarizing beam splitters, a horizontal polarization filter 44 is arranged between the polarizing beam splitter 40 and the light source 32 in the second display device 31. This horizontal polarization filter 44 brings light from light source 32 to the horizontally polarized state before this light is reflected by the polarizing beam splitter 40. Due to the absence of a light fraction with a vertical state of polarization, there is no light beam 43 which is not reflected by the polarizing beam splitter 40, and light 41 and light 42 are equal to each other, both as regards properties and intensity. As from the polarizing beam splitter 40, the situation for light coming from light source 32 is equal to the situation in display device 1 of FIG. 1. The reflected, horizontally polarized light 42 consecutively passes through the transmissive liquid crystal matrix 37 which, dependent on the virtual image to be generated, has a modulating influence on light 42, and the vertical polarization filter 36 and the magnifying lens 35 in order to visualize an image light 45 which is representative of the image generated in the transmissive liquid crystal matrix 37.

As compared with display device 1, the semi-transmissive mirror 2 and the shutter 17 in display device 31 of FIG. 2 are replaced by a combination of a liquid crystal 46 and the horizontal polarization filter 47. Light 48 is polarized by the horizontal polarization filter 47 to horizontally polarized light 49. Dependent on the control of the liquid crystal 46, the horizontally polarized light changes its state of polarization. The light 50 which is horizontally polarized or not horizontally polarized is subsequently reflected in a vertically polarized state (reference numeral 51) and partly passed on in a horizontally polarized state by the polarizing beam splitter 40 in a ratio which is dependent on the extent of the change of polarization that has taken place in liquid crystal 46. Light 52 originating from the reality image 39 has the same state of polarization as the reflected light 42 from light source 32. The intensity of light 52 is notably dependent on the extent to which the change of polarization has taken place in the liquid crystal 46. By adjusting the liquid crystal 46, a suitable ratio between the intensities of light 42 and light 52 can be obtained. Similarly as light 42, light 52 will be modulated by the transmissive liquid crystal matrix 37 to modulated light 53 in the case of a virtual image, which modulation is opposed to the modulation of light 42 to modulated light 54. Dependent on the extent of the change of polarization, this modulated light 53 will pass through the vertical polarization filter 36 and become visible to the eye 33 after passage through the magnifying lens 35.

A major distinction between display device 31 of FIG. 2 and display device 1 of FIG. 1 is that both the light from light source 32 and that from the reality image 39 is modulated by the transmissive liquid crystal matrix 37 in the first-mentioned display device, whereas the intensity of the light of the reality image 16 cannot be steplessly adjusted in the display device 1.

The invention is not limited to the embodiments described hereinbefore, but is defined by the appendant claims. In this connection, it is to be noted that lenses 7, 19, 35 and 47 may be replaced by any other suitable optical system constituted, for example, by mirrors, holograms or lens systems.

What is claimed is:

1. A display device for positioning at least one eye defining an eye path, the device comprising:
   an artificial-image generating element in the eye path, said element having a matrix element;
   a control system for electronically driving the image-generating element, and adjusting an electrical parameter of the matrix element to control a proportional extent of transmissivity through the matrix element in forming a modulated light beam, and
   a magnifying optical system disposed to magnify the artificial images to a virtual image for the at least one eye, where a the image-generating element is transparent and is disposed for passing external light coming from the ambience of the display device, present in the eye path, to the eye.

2. A display device for positioning at least one eye defining an eye path, the device comprising:
   an artificial-image generating element in the eye path;
   a control system for electronically driving the image-generating element,
   a magnifying optical system disposed to magnify the artificial images to a virtual image for the at least one eye, and
   a semi-transmissive reflecting element arranged obliquely in the eye path on the side of the image-generating element remote from the at least one eye, said element reflecting light coming from a light source outside the eye path to the image-generating element and passing the external light to the eye;
   wherein the image-generating element is transparent and is disposed for passing external light coming from the ambience of the display device, present in the eye path, to the eye.

3. The device of claim 2, including an artificial light source arranged outside the eye path for illuminating the image-generating element via the semi-transmissive reflecting element.

4. The device of claim 2, wherein the semi-transmissive reflecting element comprises a semi-transmissive polarizing mirror.

5. The device of claim 1, wherein the image-generating element comprises a transmissive liquid crystal matrix.

6. A display device for positioning at least one eye defining an eye path, the device comprising:
   an artificial-image generating element in the eye path;
   a control system for electronically driving the image-generating element,
   a magnifying optical system disposed to magnify the artificial images to a virtual image for the at least one eye; and
   a polarizer arranged between the at least one eye and the image-generating element;
   wherein the image-generating element is transparent and is disposed for passing external light coming from the ambience of the display device, present in the eye path, to the eye.

7. A display device for positioning at least one eye defining an eye path, the device comprising:
   an artificial-image generating element in the eye path;
   a control system for electronically driving the image-generating element,
   a magnifying optical system disposed to magnify the artificial images to a virtual image for the at least one eye, and
   an adjustable shutter element for the external light on the side of the image-generating element remote from the at least one eye;

wherein the image-generating element is transparent and is disposed for passing external light coming from the ambience of the display device, present in the eye path, to the eye.

8. The device of claim 7, wherein the shutter element comprises a shutter which is displaceable between positions within and outside the eye path.

9. The device of claim 7, wherein the shutter comprises a liquid crystal with a polarizer on the side of the liquid crystal remote from the image-generating element.

10. The device of claim 1, wherein the magnifying optical system is present in the eye path on the side of the image-generating element facing the at least one eye.

11. The device of claim 1, including a separate optical system for the external light.

12. The device of claim 11, wherein the separate optical system is adapted to at least partly compensate the magnifying effect of the magnifying optical system on the external light.

13. A display device for positioning at least one eye defining an eye path, the device comprising:
    an artificial-image generating element in the eye path;
    a control system for electronically driving the image-generating element,
    a magnifying optical system disposed to magnify the artificial images to a virtual image for the at least one eye,
    wherein the image-generating element is transparent and is disposed for passing external light coming from the ambience of the display device, present in the eye path, to the eye;
    a semi-transmissive reflecting element arranged obliquely in the eye path on the side of the image-generating element remote from the at least one eye, said element reflecting light coming from a light source outside the eye path to the image-generating element and passing the external light to the eye; and
    an artificial light source arranged outside the eye path for illuminating the image-generating element via the semi-transmissive reflecting element, wherein the semi-transmissive reflecting element comprises a semi-transmissive polarizing mirror.

14. The device of claim 3, wherein the image-generating element comprises a transmissive liquid crystal matrix.

15. The device of claim 2, wherein the image-generating element comprises a transmissive liquid crystal matrix.

16. The device of claim 2, including a polarizer arranged between the at least one eye and the image-generating element.

17. The device of claim 2, including an adjustable shutter element for the external light on the side of the image-generating element remote from the at least one eye.

18. The device of claim 2, wherein the magnifying optical system is present in the eye path on the side of the image-generating element facing the at least one eye.

19. The device of claim 5, including a polarizer arranged between the at least one eye and the image-generating element.

20. The device of claim 5, including an adjustable shutter element for the external light on the side of the image-generating element remote from the at least one eye.

21. The device of claim 5, wherein the magnifying optical system is present in the eye path on the side of the image-generating element facing the at least one eye.

* * * * *